US009642306B1

(12) United States Patent
Crosby (10) Patent No.: US 9,642,306 B1
(45) Date of Patent: May 9, 2017

(54) OFFSET, DRIVE-ASSISTED HEADER FOR A GRAIN HARVESTER

(71) Applicant: Lon Owen Crosby, Webster City, IA (US)

(72) Inventor: Lon Owen Crosby, Webster City, IA (US)

(*) Notice: Subject to any disclaimer, the term of this patent is extended or adjusted under 35 U.S.C. 154(b) by 57 days.

(21) Appl. No.: 14/192,833

(22) Filed: Feb. 27, 2014

Related U.S. Application Data (60) Provisional application No. 61/960,439, filed on Sep. 18, 2013.

(51) Int. Cl.

| G06F 7/70 | (2006.01) |
|---|---|
| G06F 19/00 | (2011.01) |
| G06G 7/00 | (2006.01) |
| G06G 7/76 | (2006.01) |
| A01D 45/02 | (2006.01) |
| A01D 47/00 | (2006.01) |

(52) U.S. Cl.
CPC .......... *A01D 45/028* (2013.01); *A01D 47/00* (2013.01)

(58) Field of Classification Search
CPC . A01B 73/005; A01B 63/1117; A01B 69/001; A01D 67/00; A01D 75/002; A01D 41/1278; A01D 41/14; A01D 75/28; Y10S 56/09
USPC .......... 701/50; 172/286; 56/228, 14.5, 15.2, 56/15.9, 192, DIG. 9, 10.2 F
See application file for complete search history.

(56) References Cited

U.S. PATENT DOCUMENTS

| 1,632,013 | A | * | 6/1927 | Trauger | ............... | A01D 75/303 280/442 |
|---|---|---|---|---|---|---|
| 1,948,927 | A | * | 2/1934 | Lindgren | ............... | A01D 57/20 56/14.8 |
| 2,377,331 | A | * | 6/1945 | Dray | ...................... | A01D 41/04 180/14.1 |
| 2,484,981 | A | * | 10/1949 | Coultas | .................. | A01D 57/30 56/14.5 |
| 2,504,289 | A | * | 4/1950 | Waterman | ............ | A01D 75/285 198/518 |
| 2,509,357 | A | * | 5/1950 | Krause | ................... | A01D 41/14 267/73 |
| 2,800,996 | A | * | 7/1957 | Bornzin | ................ | A01F 15/101 198/670 |
| 2,841,945 | A | * | 7/1958 | Brenner | ................. | A01D 41/00 460/111 |
| 2,896,776 | A | * | 7/1959 | King | ...................... | A01D 45/00 198/314 |
| 3,090,457 | A | * | 5/1963 | Amick | ................ | A01D 45/001 180/14.7 |
| 3,336,052 | A | * | 8/1967 | Johnston | ............... | A01D 67/00 172/286 |

(Continued)

*Primary Examiner* — Árpád Fábián-Kovács (57) ABSTRACT

An offset header for attachment to a grain harvester includes a body having a back and a bottom which form a collection trough extending the length of the body. The back further defines at a first proximal and an opening for receiving and for attachment to a grain conveyor of a grain harvester. A mechanism is located at the bottom for removing and collecting a crop from an agricultural field, and a transfer mechanism is operationally positioned in the collection trough to transf's er the collected crop toward the opening. A drive unit at a second distal end of the body supports and propels the second distal end of the body in cooperation with a grain harvester.

10 Claims, 8 Drawing Sheets

(56) References Cited

U.S. PATENT DOCUMENTS

| | | | | |
|---|---|---|---|---|
| 3,457,709 A | * | 7/1969 | Reimer | A01D 75/002 56/11.9 |
| D218,984 S | * | 10/1970 | Slavens et al. | D15/26 |
| 3,537,243 A | * | 11/1970 | Bichel | A01D 61/00 56/124 |
| 3,699,751 A | * | 10/1972 | Ross | A01D 57/24 56/10.3 |
| 4,224,783 A | * | 9/1980 | Kirkpatrick | A01D 67/00 56/13.5 |
| 4,522,020 A | * | 6/1985 | Anderson | A01D 75/287 56/209 |
| 4,573,309 A | * | 3/1986 | Patterson | A01D 80/005 172/248 |
| 4,610,127 A | * | 9/1986 | Eguchi | A01F 12/18 460/59 |
| 4,662,161 A | * | 5/1987 | Patterson | A01D 80/005 172/314 |
| D300,221 S | * | 3/1989 | Odahara | D15/24 |
| 5,031,394 A | * | 7/1991 | Honey | A01D 43/077 172/285 |
| 5,911,669 A | * | 6/1999 | Stentz | A01D 41/1278 56/10.2 F |
| 6,092,013 A | * | 7/2000 | Stelzle | A01B 63/1117 180/53.6 |
| 6,125,622 A | * | 10/2000 | Brackebusch | A01D 84/00 56/365 |
| 6,209,297 B1 | * | 4/2001 | Yeomans | A01B 73/005 56/14.9 |
| 7,197,865 B1 | * | 4/2007 | Enns | A01B 73/005 56/228 |
| D723,071 S | * | 2/2015 | Jacobsthal | D15/33 |
| 2010/0326746 A1 | * | 12/2010 | Kraus | A01B 69/008 180/2.1 |
| 2011/0153172 A1 | * | 6/2011 | Anderson | A01B 69/008 701/50 |
| 2011/0295424 A1 | * | 12/2011 | Johnson | A01D 34/008 700/248 |
| 2012/0144793 A1 | * | 6/2012 | Clark | A01D 34/66 56/10.1 |

\* cited by examiner

OFFSET, DRIVE-ASSISTED HEADER FOR A GRAIN HARVESTER

CROSS-REFERENCE TO RELATED APPLICATION

This Non-Provisional Utility application claims the benefit of U.S. Provisional Patent Application Ser. No. 61/960,439 filed on Sep. 18, 2013, which is incorporated herein in its entirety.

FIELD OF THE INVENTION

The present disclosure generally relates to apparatuses and methods for harvesting agricultural grain. More particularly, the present disclosure relates to a header for a combine wherein the header is offset from the centerline of the combine.

BACKGROUND OF THE INVENTION

The agricultural industry consistently searches for methodologies to improve the yield of field crops. While new and improved varieties of corn, wheat, and soybeans have contributed greatly to increased yields at harvest, methodologies of field preparation and harvest can also impact crop yields either positively or negatively. The impact to the soil of crop harvesting operations is magnified for both grain and biomass when producers feel the need to harvest under less than optimum weather and/or soil conditions. Operation of combines to harvest the agricultural crops and the concurrent use of grain carts in the field have been identified as major contributors to soil compaction across agricultural fields as both combines and grain carts have both high gross and high axle weights.

Attempts have been made to control compaction during harvest through the use of controlled traffic lanes or designated tramlines for the harvesting equipment to traverse the field with little resulting impact because of operational issues. The major drivers of compaction are the use of grain carts used to speed harvest and the use of a grain harvester more commonly referred to as a combine. At the same time, farmers have attempted to address compaction issues by switching to radial tires, use of agricultural tracks, running dual/triple wheels, etc. However, when virtually the entire field is trampled by the combination of the grain cart and the combine, tramlines provide limited benefit.

Recognition of the impact of soil compaction on grain and biomass yields is rapidly growing, leading to interest in tramlines, both permanent and temporary, to create controlled traffic paths across fields. Effective use of tramlines can minimize the percentage of a field's surface which is impacted by soil compaction during grain harvest and other field operations. For example, by operating a grain cart in the travel tracks of the combine during a previous harvest pass, a temporary tramline can be created which exhibits some of the benefits of a permanent tramline, but that approach leaves significant room for improvement.

Soil scientists believe that there are conceptually two types of soil compaction. Deep compaction is driven by axle weight and near surface compaction is driven by ground pressure. While agricultural tracks have a conceptual advantage over tires, poor track design can result in an advantage for tires relative to compaction. One of the problems with agricultural tracks is the ground pressure peak that corresponds to the leading and trailing edge of poorly supported or improperly tensioned tracks.

Tramlines both minimize and control soil compaction in agricultural fields. Minimizing compaction increases the yield of both grain and associated biomass. Tramlines also minimize the run-down of biomass leading to enhanced biomass yields and higher biomass quality. The adoption of tramlines maximizes the quantity and quality of biomass that can effectively be removed from a field and hence the value of the biomass co-product produced by an agricultural field. At the same time, the routine use of tramlines minimizes soil compaction across a field and hence increases the production of both grain and associated biomass within a field. Concurrently, tramlines minimize the quantity of crop residue which is "run-down" during grain harvest—an important issue in maximizing the efficiency of biomass harvesting, maximizing biomass yields and optimizing biomass quality.

Increased biomass yields within a field reduces the harvest radius around a biomass processing plant, and correspondingly reduces harvesting and associated logistics costs. Further, increased biomass quality allows the operating processes of the biomass processing plant to be optimized.

Tramlines also makes feasible the harvesting of certain crops such as hay, crops grown for their chemical, food, nutraceutical or pharmaceutical properties such as oregano, at multiple times during the growing season. These multiple passes may be timed according to calendar, convenience, the plants' growth stage, etc. Multiple passes may also be used to harvest specific parts of a plant such as seed from two or more varieties/strains, etc. with different growth characteristics. For example, harvesting seed from two grass species where one species is short and the second tall; or where one forms seed early and the second one late in the growing season.

The appropriate harvesting of biomass can eliminate the need for deep tillage at the end of a crop cycle (which minimizes the oxidation of soil organic carbon which is also a factor in soil compaction) and allows adoption of no-till production in high residue crops which can also reduce compaction (and enhance soil organic carbon levels in soil). Both changes can concurrently reduce crop production expenses.

Sizing crop production equipment such as planters, sprayers, etc. to maximize the efficiency of tramlines is relatively easy, up to a point. Tramway layout and use is driven by equipment size. However, as combines and similar pieces of equipment get larger, the use of tramlines is thwarted by size. With a 30' combine header, it is barely possible to run a combine down one tramway while unloading grain into a catch cart running down the next tramway over. With a 40' header, it takes extraordinary extensions to the combine's unload auger and modifications to the catch cart to effectively utilize a tramway system. A 60' header is in commercial use outside of the USA and there is a movement to develop a 60 foot corn head to match the size of current planters available from multiple manufacturers covering 24 rows at 2.5 feet per row (i.e., 60 feet in width). For these, full use of a tramway is physically challenging.

However, 48 row planters at 2.5 feet per row planters (i.e., 120 feet in width are commercially available from multiple manufacturers. To match the combine and the planter to a common set of tramlines would require a 120 foot header. To build such a system in a conventional way is near impossible as the engineering on the header would be complicated and heavy; and the combine used to process the grain would be significant in size leading to unique compaction issues. Therefore, a header for use on a grain harvester is needed wherein a maximum field area can be covered with minimal soil compaction.

SUMMARY OF THE INVENTION

The present disclosure is generally directed to a header for use on a grain harvester wherein the header is offset from the centerline of the harvester. The offset header for attachment to a grain harvester includes a body having a back and a bottom which form a collection trough extending the length of the body. The back further defines at a first proximal end an opening for receiving and for attachment to a grain conveyor of a grain harvester. A mechanism is located at the bottom for removing and collecting a crop from an agricultural field, and a transfer mechanism is operationally positioned in the collection trough to transfer the collected crop toward the opening. A drive unit at a second distal end of the body supports and propels the second distal end of the body in cooperation with a grain harvester.

In another aspect, the header includes a plurality of resilient mounts at the opening for attaching the offset header to a grain harvester. Further, the resilient mounts are self-severing at a pre-defined force applied thereto.

In still another aspect, the drive unit is unpowered.

In yet another aspect, the drive unit includes a power source, a traction member, and a frame securing the drive unit to the body.

In a still further aspect, the traction member is selected from a group consisting of an agricultural track and a wheel.

In another aspect, the power source is selected from a group consisting of a hydraulic motor, an electric motor, pneumatic motor, and a mechanical drive.

In another aspect, the drive unit includes a positioning system.

In a still further aspect, the header includes at least a second drive unit mounted to the body at an intermediate point therealong.

In yet another aspect, a grain harvesting system comprises a grain harvester having a grain conveyor at a front thereof and an operator's cab including interactive controls for steering, regulating propulsion, and harvesting operations by an operator occupying the operator's cab. An offset header is attached to the grain conveyor and includes a body having a back and a bottom forming a collection trough extending the length of the body. The back further defines at a first proximal end an opening for receiving and for attachment to a grain conveyor of the grain harvester. A mechanism at the bottom removes and collects a crop from an agricultural field, and a transfer mechanism is operationally positioned in the collection trough to transfer the collected crop toward the opening A drive unit at a second distal end of the body propels the second distal end of the body in cooperation with the grain harvester. A control system includes a central processing unit having an associated memory, a display, a user input device, and an instruction set resident in the memory and executable by the central processing unit wherein the instruction set when executed functions to integrate and control the drive unit for maintaining the header in a desired alignment with the grain harvester in response to an operator's interactive control inputs.

In another aspect, the header includes a plurality of resilient mounts attaching the offset header to the grain harvester wherein the resilient mounts permit vertical and longitudinal movement of the offset header with respect to the grain harvester. Further, the resilient mounts are self-severing at a pre-defined force applied thereto.

In still another aspect, the drive unit includes a power source, a traction member, a steering function, and a frame securing the drive unit to the body. The motor and steering function are responsive to inputs from the central processing unit.

In yet another aspect, the traction member is selected from a group consisting of an agricultural track and a wheel.

In another aspect, the motor is selected from a group consisting of a hydraulic motor, an electric motor, pneumatic motor, and a mechanical drive.

In still another aspect, the grain harvester includes a first positioning system, and the drive unit at the distal end of the header includes a second positioning system. The first and second positioning systems are interactive to establish a position of the distal end of the header with respect to a position of the grain harvester.

In yet another aspect, the first and the second positioning systems are selected from a group consisting of strain gauges, laser measurement sensors, and radio frequency sensors.

In a still further aspect, the first positioning system is a global positioning system for determining a position of the grain harvester and the second positioning system is a global positioning system for determining a position of the distal end of the header. The central processing unit determines, as a function of the determined positions, speed and steering control inputs to the drive unit to maintain the distal end of the header in a desired orientation with a grain harvester.

In another aspect, the drive unit speed is independent of the speed of the grain harvester and is variably controlled by the central processing unit.

In another aspect, the header includes at least a second drive unit mounted to the body at an intermediate point therealong.

In a still further aspect, a method of harvesting grain from an agricultural field to minimize soil compaction includes acquiring a grain harvesting system of the type including a grain harvester having a header operationally mounted thereto. The header is offset from a centerline of the grain harvester and has a proximate end mounted to a grain conveyor of the grain harvester and a distal end extending away from the grain harvester. The distal end is supported and propelled by a drive unit affixed to the distal end of the header. Tramlines are established in the agricultural field wherein adjacent ones of the tramlines are separated by a distance of approximately twice the width of the header. The grain harvester is operated on a first pass of a first tramline to harvest the grain on a first side of the tramline. The grain harvester executes a 180° turn at the end of the tramline and is then operated on a second pass along the first tramline in an opposite direction to harvest the grain on a second side of the tramline. The bidirectional grain harvester operations are repeated on subsequent tramlines.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

There are several approaches as potential solutions to the problem of undesired excessive soil compaction in agricultural fields during the harvesting phase. First, the span of a header can be increased wherein the attachment point for the header to harvester interface is centered on the header. Additional independent supports such as wheels, tracks, etc. can be added at the outer ends of the header and at any necessary intermediate points. Ideally, these independent supports would be powered and steerable. The stresses placed on the harvester would be substantial. Moving a long header between agricultural fields presents substantial challenges and the physical size needed to harvest 48 rows of high-yielding crop is substantial. However, large headers have difficulty in following the contours of the ground being harvested. Consequently, rigid headers have access to crop losses and are susceptible to harvest damage. Therefore, large headers require a degree of built-in flexibility, thus making design and wait a significant issue.

Second, a long header frame can be built which spans the space between two tramlines, with one or both frame supports at either end of the frame being powered and steerable. One or both ends of the frame are attached to one or more combines operating in the same tramlines. The grain header of selectable with is moved along the length of the frame to harvest the field in a sequential fashion.

Third, a header can be built which is one-half of the width of the field segments between adjacent tramlines. This header, instead of having a central mount to the harvester, would have a mount offset to one end of the header and the opposite end of the header being drive assisted. The offset nature of header induces corresponding offset loads exerted on the combine, therefore the outside and of the offset header must be supported. Ideally, such a support would comprise a powered, steerable wheel or track. Such a configuration permits the harvester and offset header to take one pass down one side of the tramline thereby harvesting one-half of the width of the field segment between the tramlines, and on a return pass harvesting one-half of the adjacent field segment. With current technology and tramline widths, this is the most effective approach, and one which can be immediately implemented for field segments of 120 foot widths between tramlines. As technology improves, the length of the headers can also increase thereby requiring fewer tramlines in the field.

Disclosed is a design for an offset, drive-assisted header to be used on a harvester such as a combine, forage harvester or similar agricultural implement used in crop production systems where controlled traffic practices (tramlines) are employed. By offsetting the header to the right or left (as opposed to the traditional centering), the effective width of the header is doubled. The harvester and a self-propelled close-coupled trailing grain cart move in the same set of tracks on both the forward and reverse traverse across a field. Each traverse processes a header's width of crop from alternating sides of a tramline. This approach significantly reduces the amount of land within a field which is allocated to tramline use. For example, in tramlines on 30 foot centers and a traditional centered 30 foot header, a 10 foot section or 33% of the surface area may be compacted by the harvester and another 10 foot section may be compacted by the grain cart while operating on a path parallel to the harvester during off-loading operations for a total compaction area of 67%. With 120 foot tramline centers, a 60 foot offset header, two passes to harvest the nominal 120 foot width of crop, and a close coupled grain cart, the impacted area is reduced to 8.3%.

Figure 1:
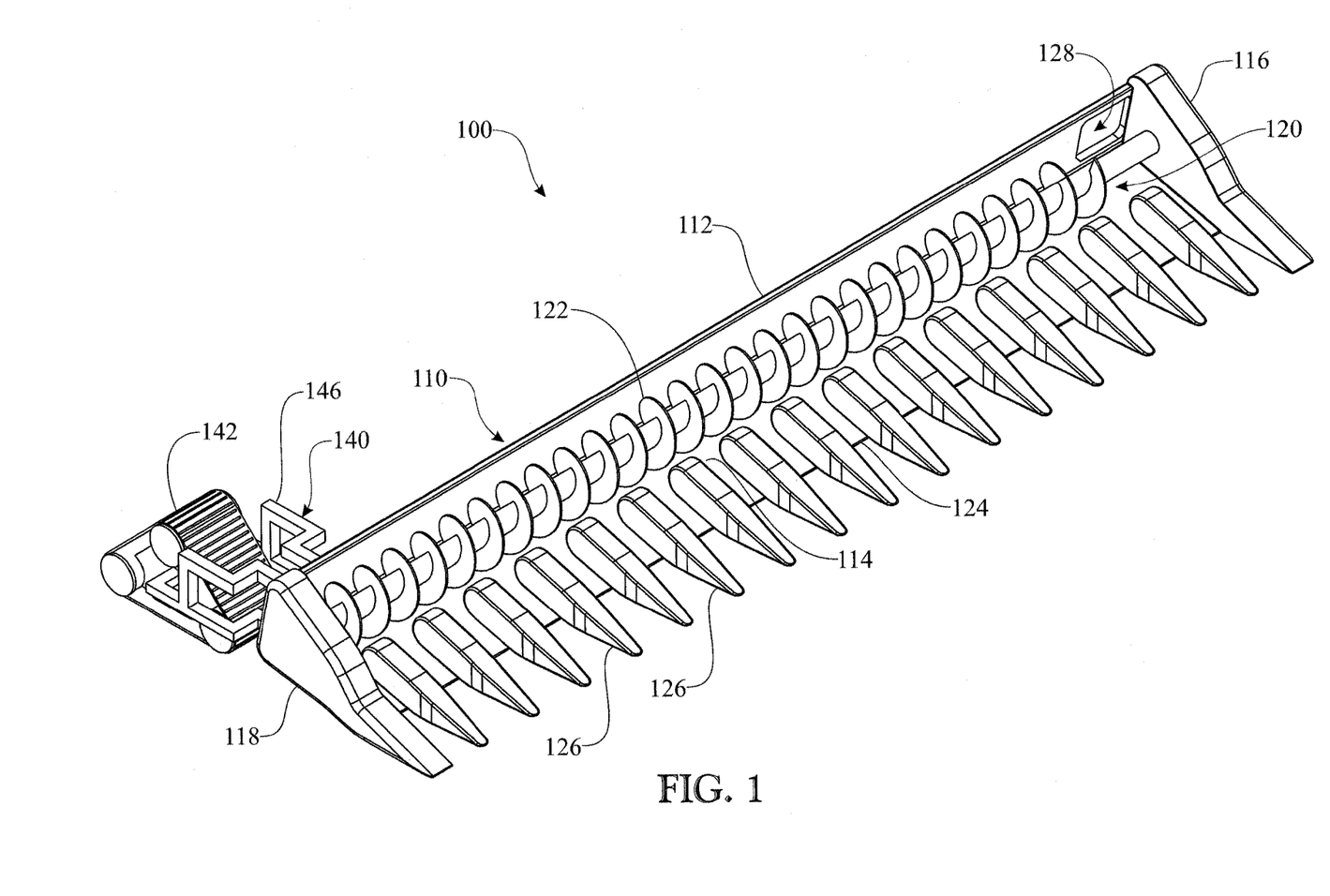
FIG. 1 presents a front isometric view of an offset grain harvester header embodying the present invention, wherein the header includes a mount for attaching to a harvester offset from the harvester centerline.
Figure 2:
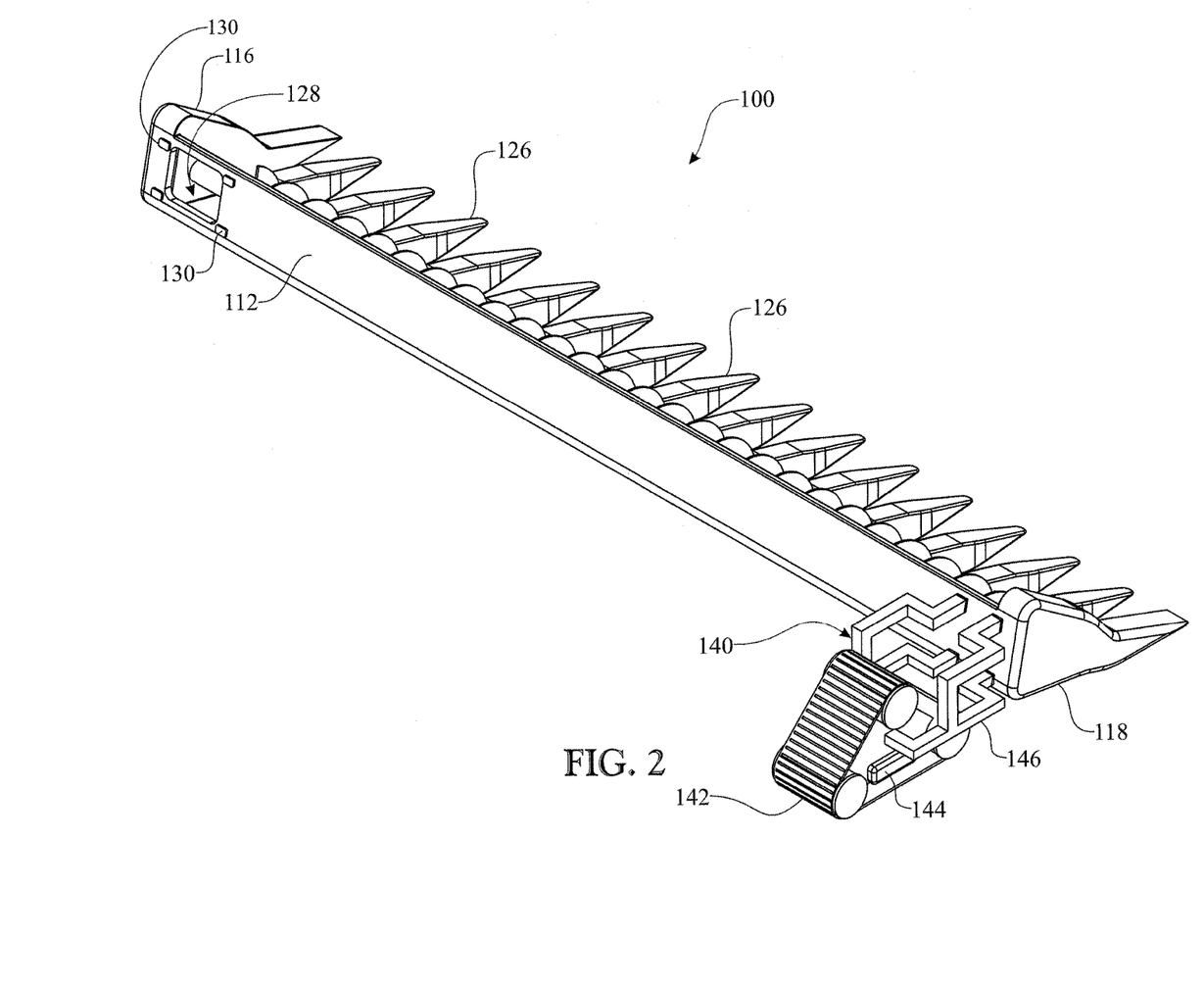
FIG. 2 presents a rear isometric view of the offset header.

In one exemplary implementation of the invention, a drive-assisted offset header 100 is shown in FIGS. 1-2 illustrating its various components where a body 110 has a back 112 and a bottom 114 which in combination define a transfer trough 120. A cutting mechanism 124, such as a known movable sickle configuration, is positioned at a forward end of the bottom 114. As illustrated, the header 100 is configured for harvesting corn and includes a plurality of snouts 126 between which respective rows of corn are guided for harvesting. Those practiced in the art, will readily recognize that the header 100 can also be configured for the harvesting of small grain such as wheat with the inclusion of a rotating reel in lieu of the snouts 126. A grain transfer mechanism 122 is operationally positioned in the transfer trough 120 and can be of any known configuration such as an auger as illustrated or a conveyor belt or chain. As the width of a header increases, the header also has an increased need for flexibility since the field surface typically undulates rather than being flat. This requirement is of greater need for crops such as wheat and soybeans where the seed head or seed pods can often be close to the field surface. However, an auger is typically rigid, therefore, as flexure features are included in the header design, a belt conveyor to transfer the harvested crop along the header becomes increasingly attractive. The header 100 also includes a proximal end shield 116 at one end thereof and a distal end shield 118 at an opposite end thereof. The end shields 116, 118 can also have enclosed therein various drive mechanisms (not shown), bearings, and miscellaneous components known in the art and required for harvesting grain from an agricultural field.

Proximate to one end of the header, i.e. near proximal end shield 116, the back 112 defines an opening 128 which is sized to receive the grain conveyor 184 (FIG. 3) of a grain harvester to transfer the cut grain from the header to the grain harvester. Further, as is known in the art, the grain conveyor 184 also functions as the mount to which the header 100 is affixed for harvesting operations. A plurality of mounts 130 affix the header 100 to the grain conveyor 184. Ideally, the mounts 130 between the header and the harvester at the proximal end of the offset header will be resilient, therefore allowing for minor mismatches in vertical and longitudinal orientations.

An assisted drive unit 140 is affixed to the header 100 and positioned on the outboard end proximate to distal end shield 118 of the offset header 100. The drive unit may be affixed to the end at distal end shield 118 or affixed to the back 112 as illustrated. The positioning of the drive unit 140 is a tradeoff between simplicity in supporting the weight of the header at the distal end and the ability of the track 142 (or wheel) to move so as to follow the desired path during a turn. Positioning of the drive unit 140 will also be affected by crop row spacing and planting approach (i.e. solid as in seeded wheat vs. row crops such as corn and soybeans). The assisted drive unit 140 includes a support frame 146 affixed to the header 100. The support frame 146 includes a traction member 142, a power source such as drive motor 144, and linkage (not shown) for steering the drive unit 140. The power source 144 for the drive unit 140 positioned therealong may be of any type, such as mechanical, electrical, hydraulic, pneumatic, etc. However, hydraulic or electrical drive power is preferred since that approach typically results in a much simpler system than does a purely mechanical system. For shorter embodiments, the attachment to the grain harvester at opening 128 may be sufficiently rigid or a brace (not shown) extending from the distal area of the header 100 to the grain harvester may provide additional rigidity such that a powered drive unit is unnecessary. In such a case, an unpowered drive unit 140 (i.e. without a power source) utilized to support the distal end 118 of the header 100.

Figure 3:
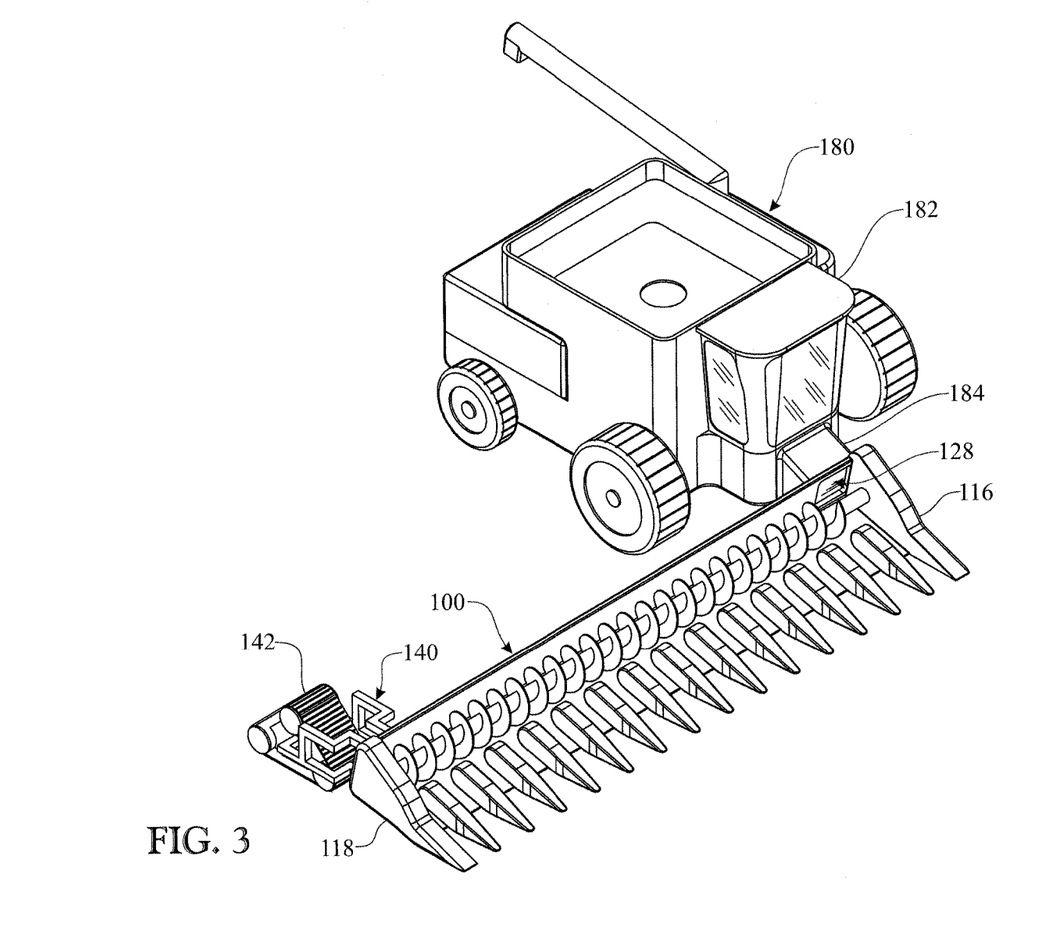
FIG. 3 presents a top front isometric of the offset header mounted to a grain harvester.
Figure 4:
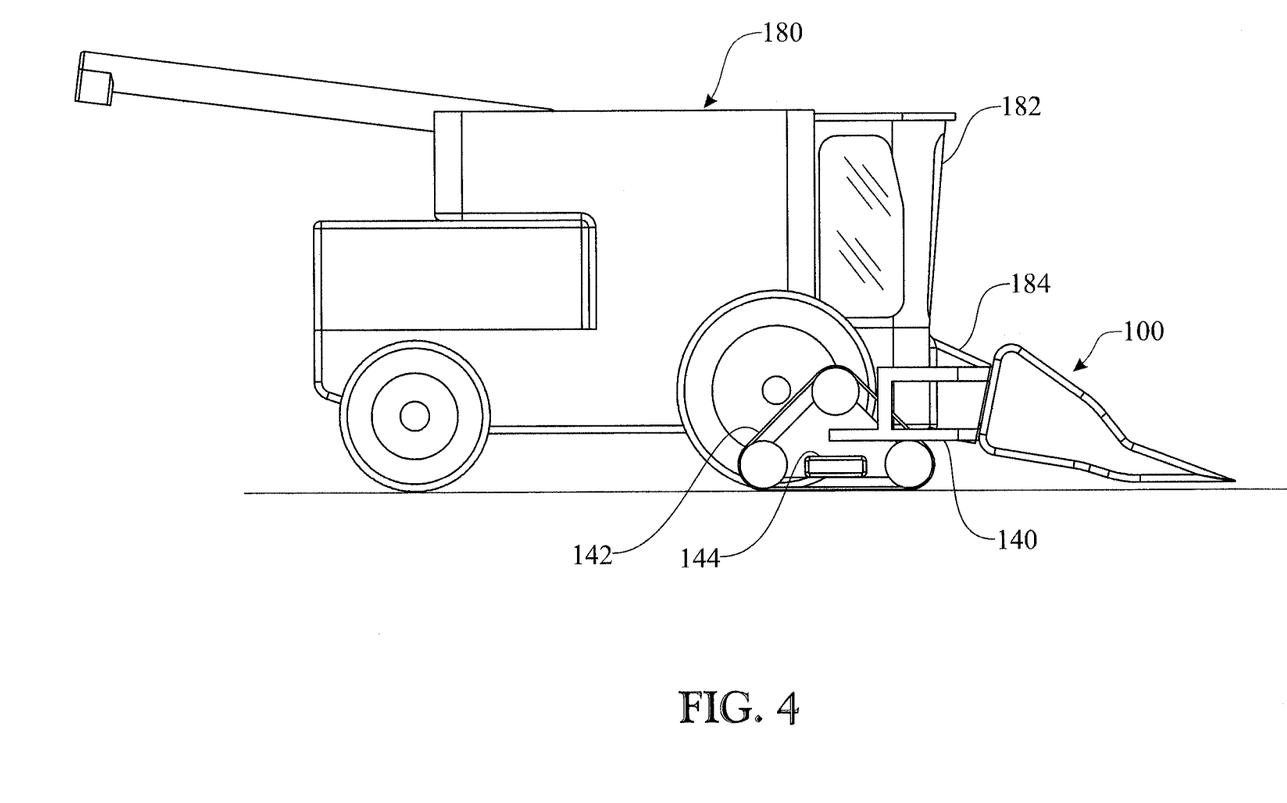
FIG. 4 presents a right side elevation view of the grain harvester and header of FIG. 3.

As illustrated in FIGS. 3-4, a harvester 180 in a typical self-propelled configuration has an operator's cab 182 at a front thereof and a centrally positioned grain conveyor 184 for interfacing with the proximate in 160 of the offset header 100. The drive unit 142 is positioned at the distal end 118 of the offset header 100 to prevent undesired torquing about the grain conveyor 184. The drive unit 142 is controlled by and coordinated with the operator controls within the operator's cab 182. Additionally, in view of the header 100 being offset to one side or the other of the grain harvester 180, the offset header 100 has an increased potential, if encountering an obstruction either in the forward or reverse direction or in the event of operational failure of the drive unit 140, to induce considerable bending moments at the point of attachment to the grain conveyor 184. Consequently, in order to prevent or minimize damage to the grain harvester 180 and the offset header 100 from these bending moments, the mounts 130 on the offset header include a 'breakaway' function wherein the mounts 130 will sever the attachment when subjected to a predefined force.

Figure 5:
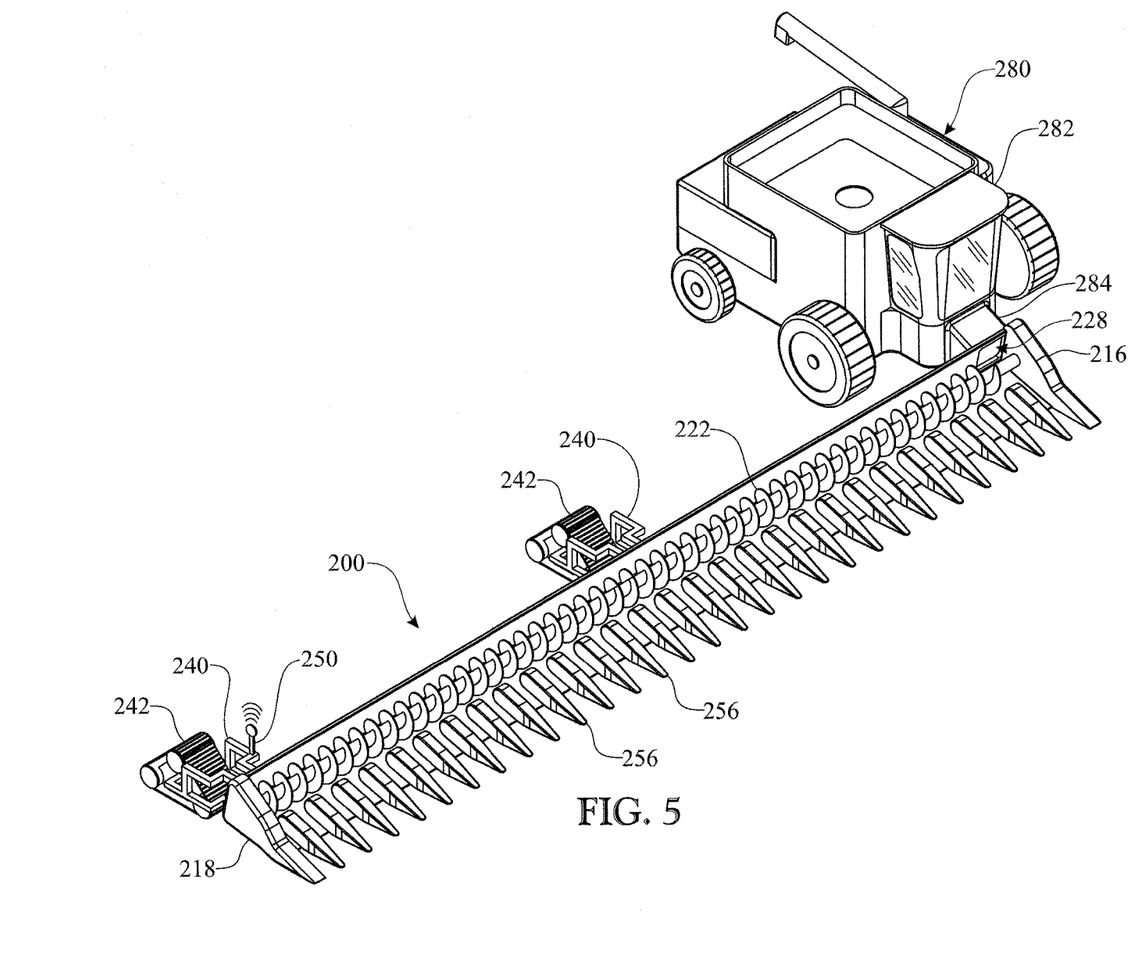
FIG. 5 presents top front isometric view of an extended length offset header mounted to a grain harvester.

Turning now to FIG. 5, an alternate embodiment offset drive assisted header 200 is illustrated wherein the length of the alternate embodiment offset header 200 is approximately twice the length of the offset header 100 discussed above. Like features of the alternate embodiment offset header 200 have similar reference numerals preceded by the numeral "2". A proximate end 216 of the offset header 200 is mounted to the grain conveyor 284 of the harvester 280 in a manner similar to the mounting of offset header 100 utilizing resilient, flexible mounts (not shown) which also have a 'breakaway' function to sever if a predefined force is exceeded at the mount. The offset header 200 has a plurality of snouts 256 for guiding rows of corn into the header for harvesting and can also be configured with a reel for harvesting small grain such as wheat and soybeans. Once the grain has been separated from the field, a grain transfer mechanism 222, here shown as an auger, delivers the grain to the opening at the proximate end 216 of the header 200 so that the grain can then be directed through the opening 228 into the harvester via grain conveyor 284. Again, the grain transfer mechanism 222 may be configured as a belt conveyor to accommodate flexibility feature incorporated into the header 200. Because of its length, the offset header 200 includes a drive unit 240 mounted proximate to a distal end 218 and at least a second drive unit 240 positioned intermediately between the proximate end 216 and the distal end 218. The header 200 can also include other configurations of supporting elements (such as wheels or rollers) between the grain harvester and the distal end 218 of the header 200. Such multiple auxiliary supports facilitate flexibility aspects of the header 200.

The outboard drive unit 140 and preferably any intermediate drive unit 240 is independently controlled for both speed and direction thereby allowing the outboard end of the header to trace any path defined by the primary harvesting system. This includes paths which require the outboard end of the offset header to follow an irregular pattern.

The ability to control the speed of individual drive units 140 mounted to the header on turns so as to account for differences in the turning radius and for drive unit slippage has significant benefits. This approach also satisfies the need to closely align the header with specific groups of rows for proper harvesting. Since the turn at the end of a set of rows in the field is seldom perfect, fine (and sometimes not so fine) adjustments are required for alignment. An independently powered and steered drive unit 140 can make the necessary adjustments without creating unnecessary forces on the offset header 100 or on the harvester 180. Independently powered front (or rear) steering wheels can reduce actual turning radius and minimize rutting and burning by the drive unit. A short turning radius of the combined harvester 180 and the attached header 100 is important since it allows tramlines to be established on headlands as well as across the length of the field. Additional advantages are apparent when traction is impaired by mud, frozen ground, side slopes, ice, snow, etc.

Figure 6:
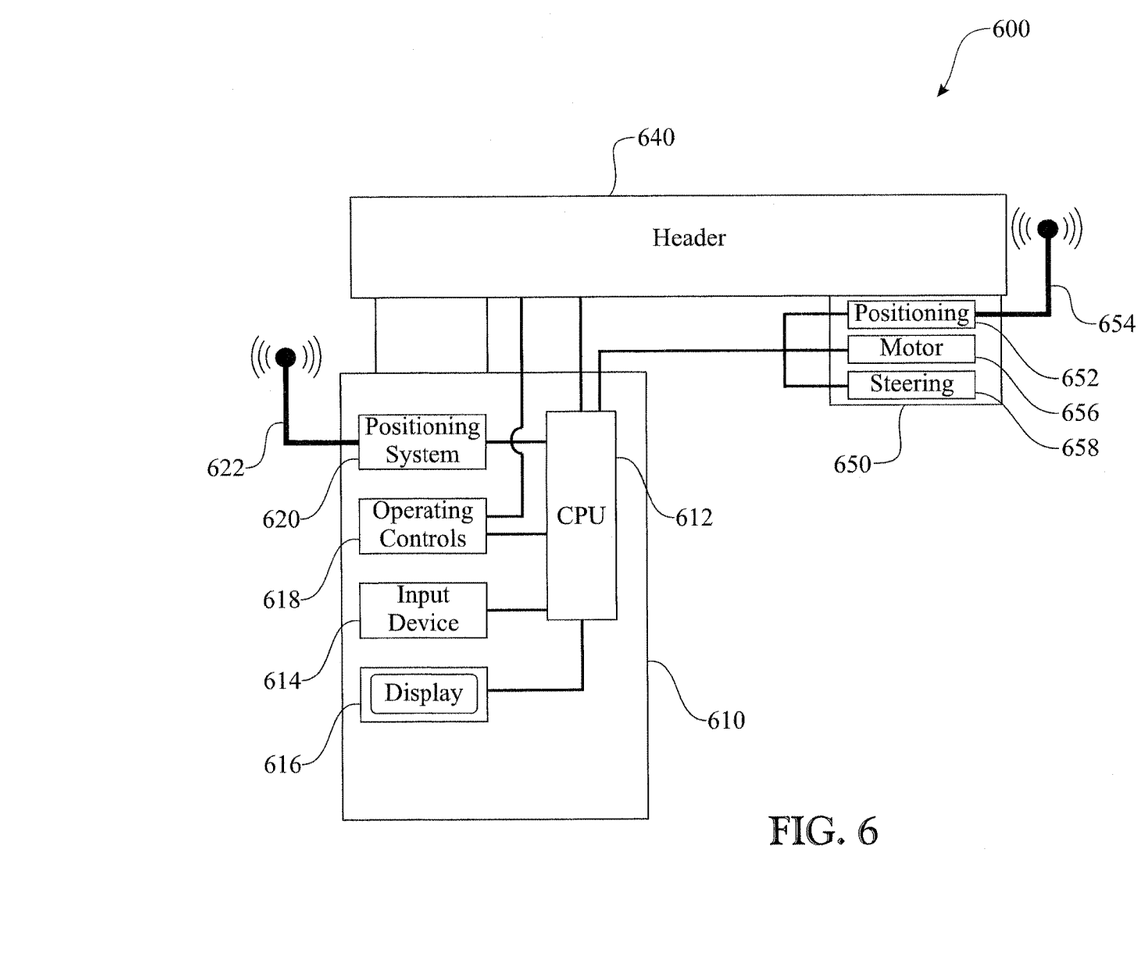
FIG. 6 presents a system block diagram of an operational system of a grain harvester having an offset header mounted to a front thereof.

FIG. 6 illustrates in block format the operational system of a grain harvester 610 having mounted thereon an offset header 640 wherein the offset header 640 is configured with a drive assisted unit 650 at a distal end of the offset header 640. The drive assisted unit 650 includes a motor 656, a steering function 658, and a position sensing system 652 which may further include an antenna 654. Within the operator's cab (i.e. control cab 182, FIG. 3) a control system comprises a central processing unit 612, a display 616, and an input device 614. The input device 614 can be either a keyboard of known configuration or alternatively be incorporated into the display 616 wherein the display 616 includes a touch sensitive screen for receiving operator inputs in a manner known in the industry. The operating controls 618 includes a steering wheel, foot pedals, and operational levers and switches provide signal inputs to the central processing unit 612. An executable instruction set within the memory of the central processing unit 612 then issues the required control commands to subsystems throughout the harvester 610. Additionally, one or more of the operating controls 618 may be directly communicative in an analog fashion with subsystems of the harvester 610 and the offset header 640. The central processing unit 612 is also communicative with one or more functions of the offset header 640 and the drive assisted unit 650. Specifically, the central processing unit 612, by executing the instruction set therein and in response to an operator's control inputs to the operating controls 618, issues commands to the motor 656 and the steering linkage 658 of the assisted drive unit 650 to maintain the header 640 in a desired alignment with the harvester 610. Maintaining this alignment can be enhanced through the integration of signals from the positioning system 652 and a known position of the harvester 610 as determined by a positioning system 620 resident on the harvester 610 and communicative with the central processing unit 612.

Control of the outboard drive system 650 will typically be automated utilizing either close-coupling software which links the location of the outboard end of the header 640 to a reference point on the harvester. Such a positioning system could be constructed from a range of sensor systems and types (strain gauges, laser distance meters, radio frequency sensors, etc.) or be computed from GPS data received by and decoded by an antenna 654 on the outboard end of the offset header and a similar antenna 622 mounted in a known position on the harvester 610. However, under certain circumstances such as short header widths with an additional added rigidity to the header frame, the combined outboard support 146 (FIG. 1) and traction member 142 (FIG. 1) could be a passive (unpowered) wheel or track.

Figure 7:
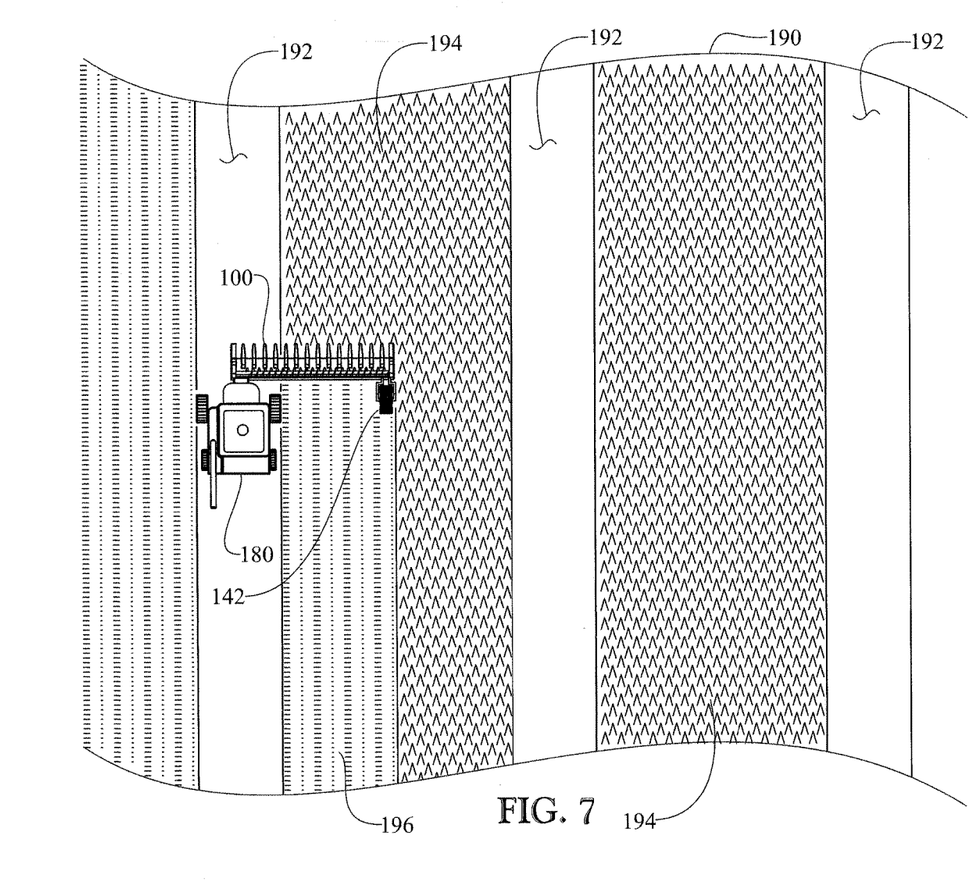
FIG. 7 presents a top plan view of a grain harvester and offset header utilizing tramlines in a field to minimize soil compaction.

In use, and as illustrated in FIG. 7, an agricultural field 190 can be subdivided by a plurality of tramlines 192 spaced at approximately twice the length of an offset header 100 according to the present invention and having a width approximating the width of the harvester 180. The schematic of FIG. 7 illustrates the tramlines 192 as having no agricultural crops growing thereon for the sake of clarity, however, it is anticipated that such tramlines 192 will also have crops planted thereon which are expected to have a lower yield as a result of the soil compaction occurring on the tramlines 192. To harvest the grain from the agricultural field 190 the harvester 180 with an offset header 100 will make a first pass down a tramline 192 to harvest the grain on one side of the tramline 192 (harvested portion of the field is identified with the reference numeral 196), and at the end thereof execute a 180° turn with the traction member 142 maintaining the distal end of the header 100 in alignment with the harvester 180. The harvester 180 then makes a second pass up the same tramline 192 to harvest the grain on an opposite side of the tramline 192. As illustrated, the harvester 180 and offset header 100 have harvested the agricultural crop on the left side of the first tramline 192 and have partially completed its second passage along the first tramline 192 harvesting one half of the agricultural crop 194. Upon reaching the end of the first tramline 192, the harvester 180 and offset header 100 will execute another 180° turn to enter an adjacent tramline 192. In this manner, soil compaction in the agricultural field 190 can be limited to the tramlines 192 and thereby maximizing crop yields in the non-traveled areas. It is also recognized that the harvester 180 and offset header 100 may adopt alternate patterns of crop harvesting in lieu of left to right sequencing.

Figure 8:
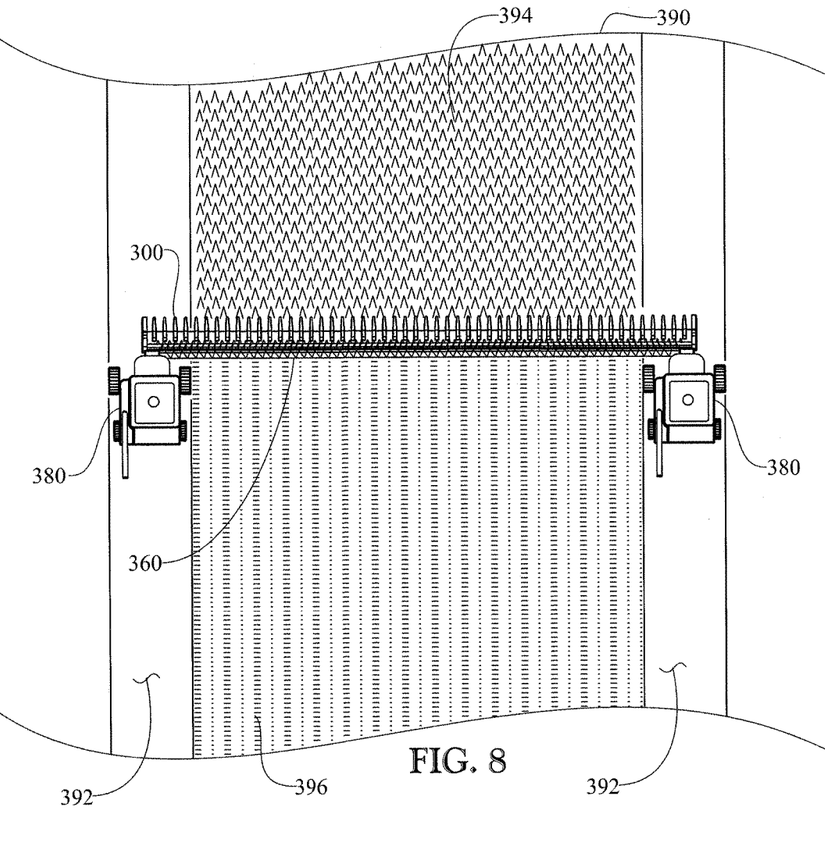
FIG. 8 presents an alternate embodiment header having each end thereof mounted to a grain harvester wherein each harvester is operating on a tramline.

The offset header concept can easily be extended to the concept where a header 300 is mounted to a system wherein the header is replaced by a truss 360 extending between a first harvester 380 to an independent carrier operating in an adjoining tramline such as a second harvester 380. The independent carrier may also be a motorized device other than a second harvester. In this configuration, the header 300 may be attached directly to the truss 360 or supporting structure and moved along its length as sequential passes are made to harvest the land between two parallel tramlines 392. The standing structure can be a simple metal beam or a more sophisticated support such as one or more trusses 360 which increases the strength and rigidity or provides for specific, components such as a conveyor to move materials or product along the length of the structure. Such a standing system can easily be structured for purposes other than harvesting such as supporting a spray boom, fertilizer distribution system, cultivator, or electronic sensor packages to monitor growth, diseases, insect populations, etc. This configuration also enables the selective harvesting within the field.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. A grain harvesting system comprising:
   a grain harvester having a grain conveyor at a front thereof and an operator's cab including interactive controls for steering, regulating propulsion, and harvesting operations by an operator occupying said operator's cab;
   an offset header attached to said grain conveyor, said offset header comprising:
     a body having a back and a bottom, said back and said bottom forming a collection trough extending a length of said body, said back further defining at a first proximal end an opening for receiving and for attachment to a grain conveyor of said grain harvester;
     a mechanism at the bottom for removing and collecting a crop from an agricultural field;
     a transfer mechanism operationally positioned in said collection trough to transfer the collected crop toward said opening;
     a drive unit at a second distal end of said body for propelling said second distal end of said body in cooperation with said grain harvester; and
   a control system further comprising:
   a central processing unit having an associated memory;
   a display;
   a user input device; and
   an instruction set resident in said memory and executable by said central processing unit wherein said instruction set when executed functions to integrate and control said drive unit for maintaining said header in a desired alignment with said harvester in response to an operator's interactive control inputs.

2. The grain harvesting system according to claim 1 including a plurality of resilient mounts attaching said offset header to said grain harvester, said resilient mounts permitting vertical and longitudinal movement of said offset header with respect to said grain harvester, and further wherein said resilient mounts are self-severing at a pre-defined force applied thereto.

3. The grain harvesting system according to claim 1 wherein said drive unit includes a motor, a traction member, a steering function, and a frame securing said drive unit to said body, said motor and said steering function responsive to inputs from said central processing unit.

4. The grain harvesting system according to claim 3 wherein said traction member is selected from a group consisting of an agricultural track and a wheel.

5. The grain harvesting system according to claim 3 said motor is selected from a group consisting of a hydraulic motor, an electric motor, pneumatic motor, and a mechanical drive.

6. The grain harvesting system according to claim 1 wherein said grain harvester includes a first positioning system and further wherein said drive unit at said distal end of said header includes a second positioning system, said first and said second positioning systems being interactive to establish a position of said distal end of said header with respect to a position of said grain harvester.

7. The grain harvesting system according to claim 6 wherein said first and said second positioning systems are selected from a group consisting of strain gauges, laser measuring sensors, and radio frequency sensors.

8. The grain harvesting system according to claim 6 wherein said first positioning system is a global positioning system for determining a position of said grain harvester and wherein said second positioning system is a global positioning system for determining a position of said distal end of said header, and further wherein said central processing unit determines, as a function of the determined positions, speed and steering control inputs to said drive unit to maintain said distal end of said header in a desired orientation with said grain harvester.

9. The grain harvesting system according to claim 8 wherein said drive unit speed is independent of a speed of said grain harvester and is variably controlled by said central processing unit.

10. The grain harvesting system according to claim 1 further including a second drive unit mounted to said body at an approximate midpoint thereof.

\* \* \* \* \*